United States Patent [19]
Childers

[11] Patent Number: 5,547,250
[45] Date of Patent: Aug. 20, 1996

[54] CART CADDY FOR SHOPPING CARTS

[76] Inventor: Shirley A. Childers, 33 Mapleshade La., Pittsgrove, N.J. 08318

[21] Appl. No.: 325,136

[22] Filed: Oct. 21, 1994

[51] Int. Cl.⁶ .................................................. A47C 1/08
[52] U.S. Cl. .............................. 297/256.17; 297/219.12; 297/485
[58] Field of Search ........................ 297/219.12, 256.17, 297/485, 488, 229, 250.1; 280/33.993, 33.992

[56] References Cited

U.S. PATENT DOCUMENTS

| | | | |
|---|---|---|---|
| 4,666,207 | 5/1987 | Quartano | 297/219.12 X |
| 4,805,937 | 2/1989 | Boucher | 297/219.12 X |
| 4,867,464 | 9/1989 | Cook | 297/485 X |
| 5,238,293 | 8/1993 | Gibson | 297/405 X |
| 5,330,250 | 7/1994 | Reyes | 297/256.17 X |

Primary Examiner—Laurie K. Cranmer
Attorney, Agent, or Firm—Norman E. Lehrer; Jeffrey S. Ginsberg

[57] ABSTRACT

There is provided a cushioned seating device to be used in conjunction with a shopping cart of the type including a grill frame having a front wall and a rear wall, an end panel being pivotally secured to the rear wall and a collapsible seat having a horizontal seat member and a back rest. The seating device comprises a central padded portion having a first end and a second end. A padded end panel cover portion extends from the first end of the central padded portion. A padded seat back portion extends from the second end of the central padded portion. The seat back portion has a first section hingedly connected to a second section. A pair of wing members extend from opposing sides of the second section of the seat back portion. The wing members are positioned around the child and are fastened to one another so that the child's torso is firmly secured against the back rest portion of the shopping cart.

4 Claims, 2 Drawing Sheets

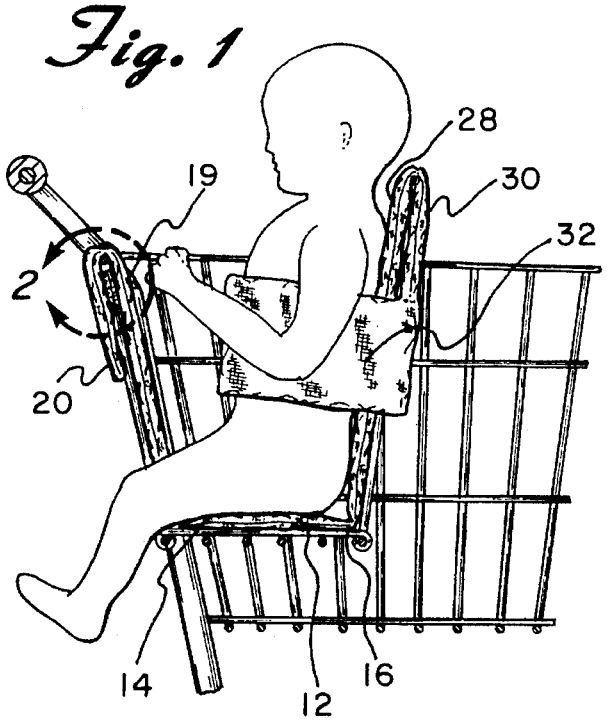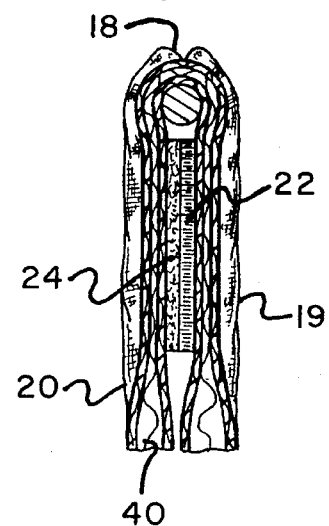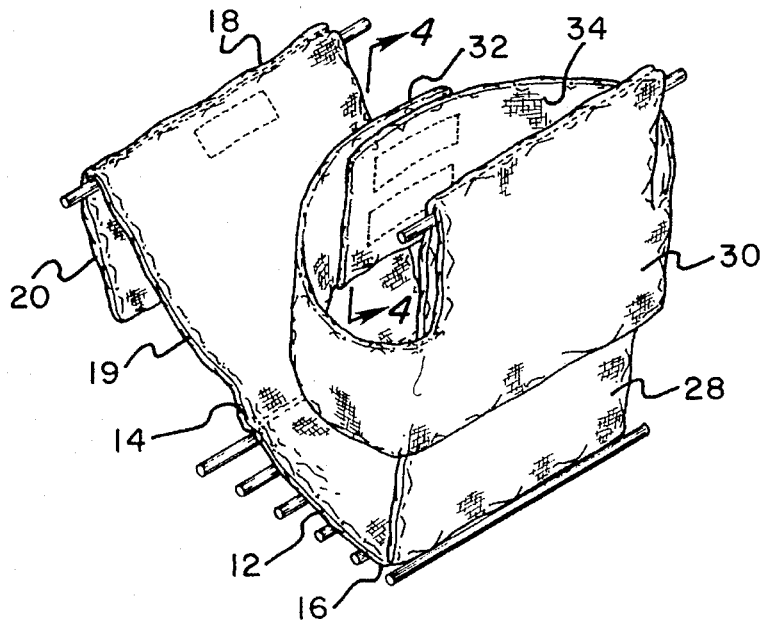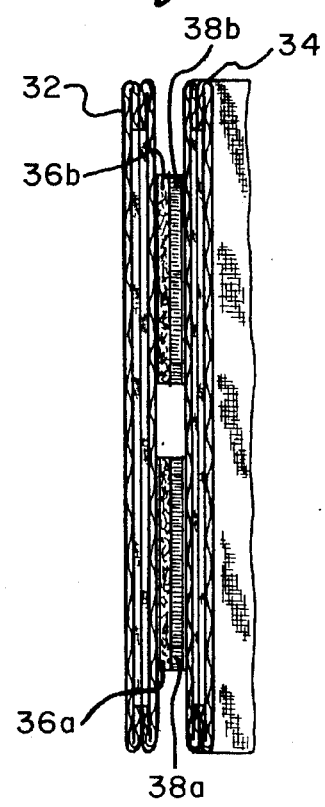

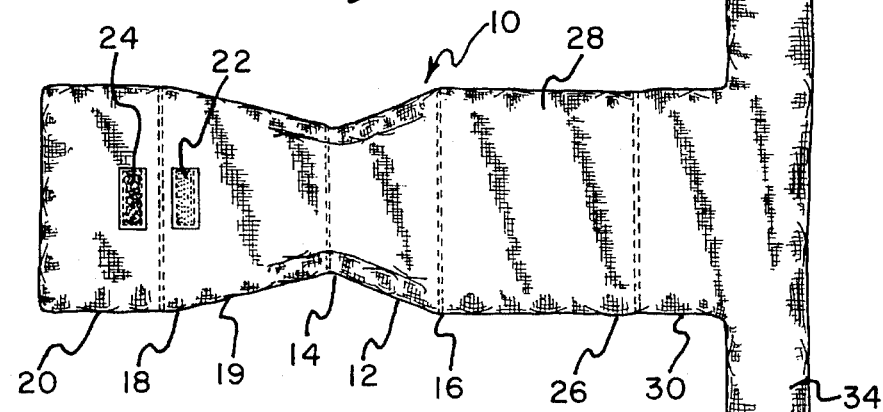
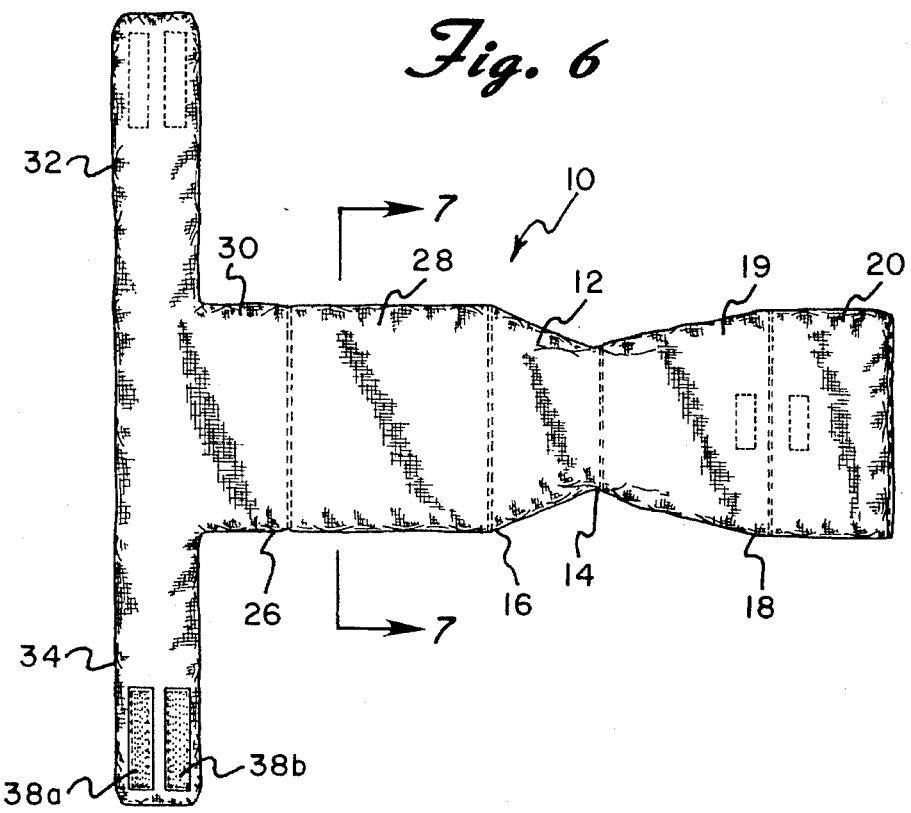

CART CADDY FOR SHOPPING CARTS

BACKGROUND OF THE INVENTION

The present invention is directed toward a cart caddy for shopping carts and, more particularly, to such a caddy comprising a length of padded material that is adapted to firmly secure the baby in the shopping cart.

Shopping carts are commonly provided in a number of snores such as supermarkets and drug stores. These carts typically have a collapsible seat that can be used to support a small child. When a shopper is accompanied by a small child, the seat is fully extended so that the child can be seated therein.

The youngster is positioned so that he faces the person pushing the cart. The child's legs fit through openings beneath the handlebar of the cart. Accordingly, the seat provides a convenient place to put the child so that the shopper does not have to hold the youngster or, alternatively, allow him or her to freely wander about the store.

The seat portion is generally comprised of a metal grill that has a hard plastic covering mounted thereon. The back rest portion (seat back) of the seat is also a metal grill. As a result of this configuration, the aforementioned shopping cart seat does not provide a comfortable seating for the child. Another drawback with the shopping cart seat is that it does not prevent the child from standing up or otherwise moving about the cart. In addition, small children tend to pick up germs by placing their mouths on the metal grill. Accordingly, a number of devices have been developed to be inserted into a shopping cart to aid in the comfort of the child and/or secure the child in the shopping cart.

U.S. Pat. No. 4,666,207 to Quartano, for example, discloses a cushioned seating device that has one end secured around the handle bar of a shopping cart and the opposite end secured to the too of tile back rest portion of the shopping cart seat. A seat belt is provided to secure a child to the cushion. However, since the device is only attached to the top of the back rest portion of the shopping cart seat, the child can laterally move his lower torso away from the back rest. This device, therefore, does not securely hold the child in place in the shopping cart.

U.S. Pat. No. 4,655,502 to Houllis also shows a seat cushion for the seat portion of a shopping cart. Again, this device does not impede lateral movement of the lower torso of the child as the cushion is only attached to the top portion of the seat back. U.S. Pat. Nos. 4,805,.937 and 5,238,293 suffer from the same deficiency.

There are known devices that secure a child directly to the seat back portion of a shopping cart. See, for example, U.S. Pat. No. 4,867,464 to Cook. However, this patent does not provide a cushioned surface for the child to sit on. See, also, U.S. Pat. No. 3,306,661.

Accordingly, there is a need for a cart caddy for shopping carts that provides the child with a cushioned seating area and impedes the lateral movement of the child while seated in the shopping cart.

Summary of the Invention

The present invention is designed to overcome the deficiencies of the prior art discussed above. It is an object of this invention to provide a cart caddy for a shopping cart that allows a child to sit comfortably in the seat portion of a shopping cart.

It is a further object of this invention to provide a cart caddy that firmly secures the child against the back of the seat in the shopping cart so that he can not stand up.

It is yet another object of the invention to provide a cart caddy that is washable for sanitary purposes.

In accordance with the illustrative embodiments, demonstrating features and advantages of the present invention, there is provided a cushioned seating device to be used in conjunction with a shopping cart of the type including a grill frame having a front wall and a rear wall, an end panel pivotally secured to the rear wall of the frame, a handle bar extending upwardly and outwardly from the end panel and a collapsible seat having a horizontal seat member and a back rest.

The seating device comprises a central padded portion having a first end and a second end. A padded end panel cover portion extends from one end of the central padded portion. The end panel cover portion includes a first segment hingedly connected to the second segment. A plurality of loop type fasteners are secured to the bottom surface of the first segment of the end panel cover portion. Similarly, a plurality of complimentary hook type fasteners are secured to the bottom surface of the second segment of the end panel cover portion. A padded seat back portion extends from the opposite end of the central padded portion. The seat back portion has a first section hingedly connected to the second section. Strap means extend from the sides of the second section of the seat back portion. The strap means secure a child's torso against the back rest portion of the shopping cart.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a side view of the cart caddy shown mounted to a shopping cart;

FIG. 2 is cross-sectional view taken along line 2 of FIG. 1;

FIG. 3 is left, rear perspective view of the cart caddy;

FIG. 4 is a cross-sectional view taken along lines 4—4 of FIG. 3;

FIG. 5 is a bottom plan view of the cart caddy;

FIG. 6 is a top plan view of the cart caddy, and

FIG. 7 is a cross-sectional view taken along lines 7—7 of FIG. 6.

DETAILED DESCRIPTION OF THE PREFERRED EMBODIMENT

Referring now to the drawings in detail wherein like reference numerals have been used throughout the various figures to designate like elements, there is shown in the figures a cushioned seating device constructed in accordance with the principles of the present invention and designated generally as 10.

The cushioned seating device or cart caddy 10 includes a padded central portion 12 that has a first end 14 and a second end 16. The sides of portion 12 converge toward first end 14. In the preferred embodiment, the central portion is approximately 7½" long, 14"inches wide at its second end 16 and 9" inches wide at its first end 14.

A padded end panel cover portion 18 extends from the first end 14 of the central portion 12. The end panel cover portion 18 includes a first segment 19 hingedly connected to a second segment 20. The sides of first segment 19 preferably converge toward the first end 14 of central portion 12. The first segment 19 is preferably 10½" inches long, 9" inches wide at the end adjacent the first end 14 of central portion 12 and 14" inches wide at the opposite end. The second segment 20 is preferably 7" inches long and 14" inches wide. A strip 22 containing a plurality of loop type fasteners is secured to the bottom surface of the first segment 19 of the end panel cover portion 18. A strip 24 containing a plurality of complimentary hook type fasteners is similarly secured to the bottom surface of the second segment 20 of the end panel cover portion 18. The strips 22 and 24 are preferably 4" inches long and 1½ inches wide.

A padded seat back portion 26 extends from the second end 16 of central padded portion 12. The seat back portion 26 has a first section 28 and a second section 30. The first section 28 is hingedly connected to the second section 30. The first section 28 is preferably 12" long and 14" wide. The second section 30 is preferably 10" long and 14" wide.

Strap means extend from the sides of the second section 30 of the seat back portion 28 for firmly securing a child's torso against the back rest portion of the shopping cart. The strap means comprises a first wing member 32 which extends from one side of the second section 30 of the seat back portion 26 and a second wing member 34 which extends from the opposite side of the second section 30 the seat back portion 26. The wing members 32 and 34 are preferably 6" wide and 17½" long.

The first wing member 32 has a pair of strips 36a, 36b secured to the bottom thereof. Each strip 36a, 36b contains a plurality of hook type fasteners. The second wing member 34 has a pair of strips 38a, 38b secured to the top thereof. Each strip 38a, 38b contains a plurality of complimentary loop type fasteners. Strips 36a, 36b and 38a, 38b are preferably 6½" long and 1½" wide.

In the preferred embodiment, the cushioned seating device is made of a woven fabric material. Padding 40 is inserted between the end panel cover portion 18, the padded seat portion 12 and the seat back portion 26.

To facilitate an understanding of the principles associated with the foregoing apparatus, its operation will now be briefly described. The cushioned seating device 10 is secured in a shopping cart of the type that includes a grill frame with a front wall and a rear wall, an end panel pivotally secured to the rear wall of the frame, a handle bar extending upwardly and outwardly from the end panel and a collapsible seat having a horizontal seat member and a back rest. The back rest has a front surface and a rear surface. The device 10 is secured to the collapsible seat of the shopping cart in the following manner. The bottom of the second segment 20 of the end panel cover portion 18 is placed over the end panel of the grill frame below the handle of the shopping cart. The hook type fasteners of strip 24 on the bottom of second segment 20 engage the loop type fasteners of strip 22 on the bottom of first segment 19 to secure the end panel cover portion 18 in place (see FIG. 1).

The padded central portion 12 is positioned atop the horizontal seat member of the shopping cart seat. The first section 28 of seat back portion 26 extends up the front side of the seat back or back rest of the shopping cart seat. The second section 30 of the seat back portion 26 extends over the opposite side of the seat back of the shopping cart seat. A child is then seated on the cushioned seating device 10 so that his or her back is adjacent the first section 28 which is against the seat back of the shopping cart seat as shown in FIG. 1. Wing members 32 and 34 are then positioned around the child. The hook type fasteners 36a and 36b on the bottom of first wing member 32 engage the loop type fasteners 38a and 38b on the top of second wing member 34 to secure the child's torso against the seat back of the shopping cart. Accordingly, the child's range of movement is limited.

The present invention may be embodied in other specific forms without departing from the spirit or essential attributes thereof and accordingly reference should be made to the appended claims rather than to the foregoing specification as indicating the scope of the invention.

I claim:

1. A cushioned seating device and a shopping cart wherein said shopping cart includes a grill frame having a front wall and a rear wall, an end panel pivotally secured to said rear wall of said grill frame, a handle bar extending upwardly and outwardly from said end panel and a collapsible seat having a horizontal seat member and back rest having a front surface and a rear surface wherein said cushioned seating device comprises:

a central padded portion having a first end and a second end, said central padded portion being located on said horizontal seat member;

a padded end panel cover portion extending from said first end of said central padded portion, said end panel cover portion having a first segment and a second segment, said first segment being hingedly connected to said second segment;

means securing said end cover portion over said end panel of said grill frame below said handle bar of said shopping cart whereby said handle bar remains exposed;

a padded seat back portion having a predetermined width and extending from said second end of said central padded portion, said seat back portion having a first section and a second section flexibly connected to said first section, said first section being positioned against said front surface of said back rest and said second section being positioned against said rear surface of said back rest, and strap means secured to and extending outwardly from the sides of said second section of said seat back portion around said back rest and adapted to pass around the torso of a child seated in said seat.

2. The seating device of claim 1 wherein said strap means has a width approximately equal to one quarter said width of said seat back portion.

3. The seating device of claim 1 wherein said securing means comprises a plurality of loop type fasteners secured to the bottom surface of said first segment of said end panel cover portion, and a plurality of hook type fasteners secured to the bottom surface of said second segment of said end panel cover portion.

4. The seating device of claim 3 wherein said strap means comprises a first wing member extending from one side of said second section of said seat back portion and a second wing member extending from the opposite side of said second section of said seat back portion, said first wing member having a plurality of hook fasteners secured to the bottom thereof, said second wing member having a plurality of loop fasteners secured to the top thereof.

* * * * *